United States Patent [19]

Albright

[11] 4,006,765
[45] Feb. 8, 1977

[54] WHEEL HAVING RESILIENT SPOKE MEANS

[76] Inventor: Penrose Lucas Albright, 1523 Woodacre Drive, McLean, Va. 22101

[22] Filed: Nov. 25, 1974

[21] Appl. No.: 527,018

Related U.S. Application Data

[63] Continuation of Ser. No. 309,698, Nov. 27, 1972, abandoned, which is a continuation-in-part of Ser. No. 871,656, Nov. 14, 1969, abandoned, which is a continuation of Ser. No. 725,336, April 30, 1968, abandoned, which is a continuation-in-part of Ser. No. 504,949, Oct. 24, 1965, Pat. No. 3,380,779.

[52] U.S. Cl. .................................................. 152/12
[51] Int. Cl.² ........................................... B60B 9/04
[58] Field of Search ............ 180/7 R; 301/41 R, 43, 301/5, 38, 40 S; 305/1–5; 152/336, 11, 12, 14, 74, 80, 15, 16

[56] References Cited

UNITED STATES PATENTS

| 1,507,470 | 9/1924 | Crosley | 301/40 R |
| 3,234,988 | 2/1966 | Cummings | 152/12 |
| 3,418,960 | 12/1968 | Nelson | 301/41 R |
| 3,590,897 | 7/1971 | Bragdon | 180/7 |

*Primary Examiner*—Stanley H. Tollberg

[57] ABSTRACT

A wheel wherein the periphery comprises overlapping resilient members so that viewed from the side such members form a continuous circle about the wheel's axle; the spokes connecting such members with the axle extending within the surface of an imaginary cone having the same axis of the axis of rotation of the wheel; the individual peripheral members either not being connected or being connected in a manner that the periphery is, in effect, expansible and resiliently expands when force is applied parallel to the axle whereby the apex angle of the imaginary cone is enlarged.

9 Claims, 17 Drawing Figures

U.S. Patent  Feb. 8, 1977  Sheet 1 of 4  4,006,765
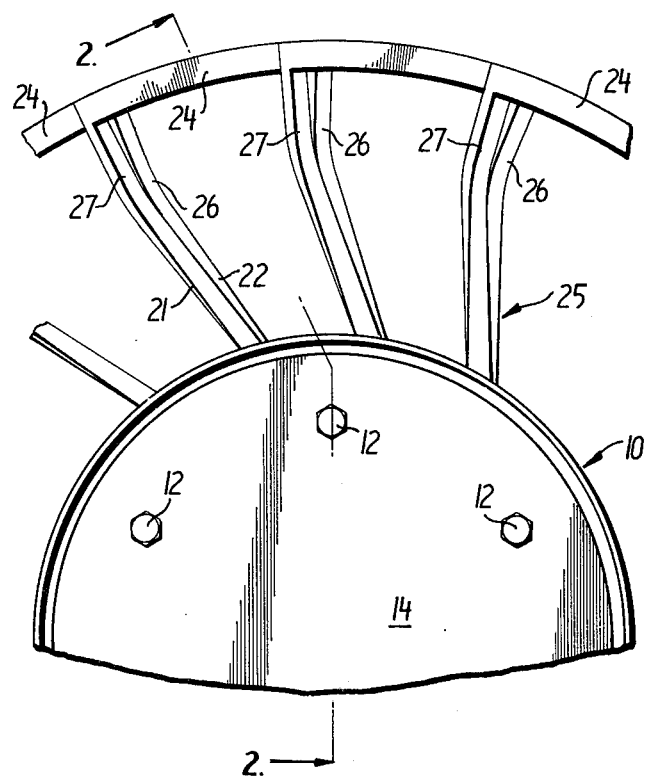
FIG. 1
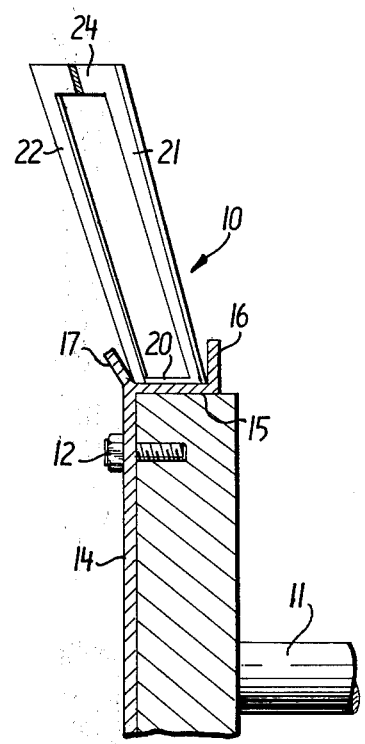
FIG. 2
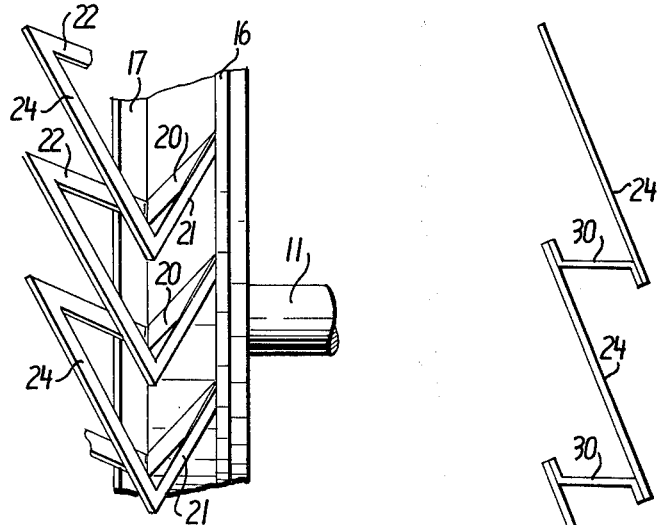
FIG. 3
FIG. 4

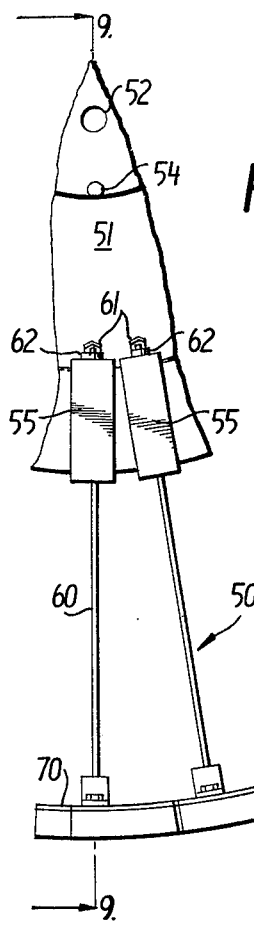
FIG. 8
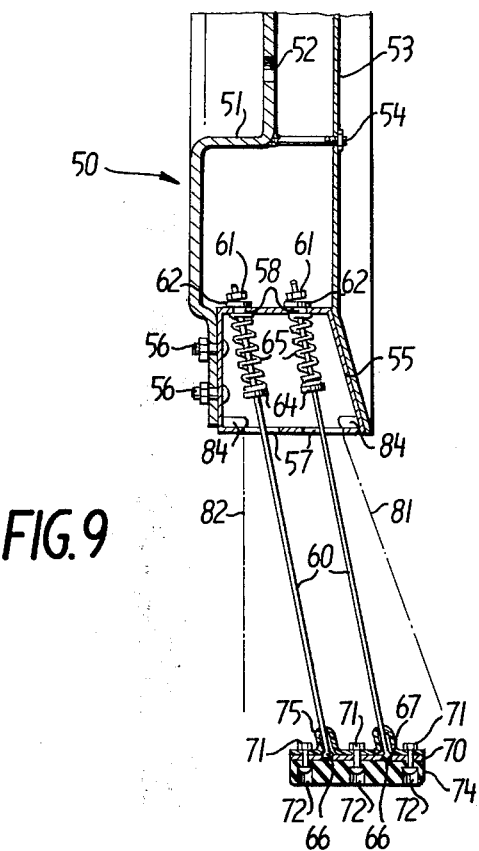
FIG. 9
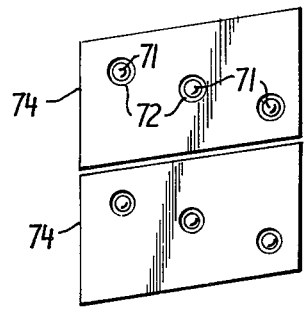
FIG. 10
FIG. 10a
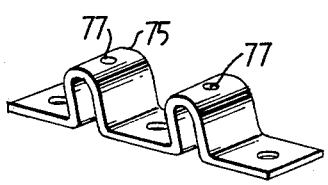
FIG. 11
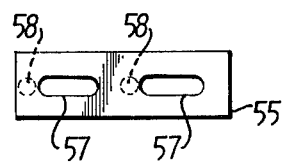
FIG. 12

WHEEL HAVING RESILIENT SPOKE MEANS

CROSS-REFERENCES TO RELATED APPLICATIONS

This is a continuation of application Ser. No. 309,698, filed Nov. 27, 1972, abandoned, which is a continuation-in-part application of application Ser. No. 871,656, filed Nov. 14, 1969, abandoned, continuing application of Ser. No. 725,336 filed Apr. 30, 1968, abandoned, a continuation-in-part application of Ser. No. 504,949 filed Oct. 24, 1965, now Patent No. 3,380,779.

BACKGROUND OF THE INVENTION

A need exists for practicable means to counteract the tendency of a vehicle making a curve on a flat surface to lean outward and, if its speed is excessive, to slide or roll over or both due to centrifugal forces acting on the vehicle.

SUMMARY OF THE INVENTION

This invention relates to an improved wheel with a periphery adapted to expand or contract in response to forces acting parallel to its axle so that the tendency of a vehicle having such wheels on both sides to lean outward in making a curve is counteracted by expansion of the wheels farther from the center of the curve and by contraction of the wheel nearest the center. In addition, a means for absorbing lateral force on a vehicle within limits is provided in the wheel whereby the tendency of the vehicle to slide under such conditions is diminished.

Other objects, adaptabilities and capabilities will be appreciated as the description progresses, reference being had to the accompanying drawings in which:

BRIEF DESCRIPTION OF THE DRAWINGS

FIG. 1 is a fragmentary side view of one embodiment of the invention;

FIG. 2 is a sectional view, partly in elevation, taken on line II — II of FIG. 1;

FIG. 3 is a schematic plan view of the embodiment shown in FIG. 1;

FIG. 4 is a schematic plan view similar to FIG. 3 showing a modification of the embodiment;

FIG. 8 is a fragmentary side view of a still further embodiment of the invention;

FIG. 9 is a sectional view, partly in elevation, taken on lines IX — IX of FIG. 8;

FIG. 10 is a detail bottom view of a surface contacting member of the embodiment shown in FIGS. 8 and 9;

FIG. 10a, shows another embodiment of the surface contacting member;

FIG. 11 is a detail perspective view of a resilient bracket member of the embodiment shown in FIGS. 8 and 9;

FIG. 12 is a detail bottom view of a spoke guidance member in the embodiment shown in FIGS. 8 and 9;

FIG. 13 illustrates a removable resilient lug for tractors and the like;

DESCRIPTION OF THE PREFERRED EMBODIMENTS

Figure 5A:
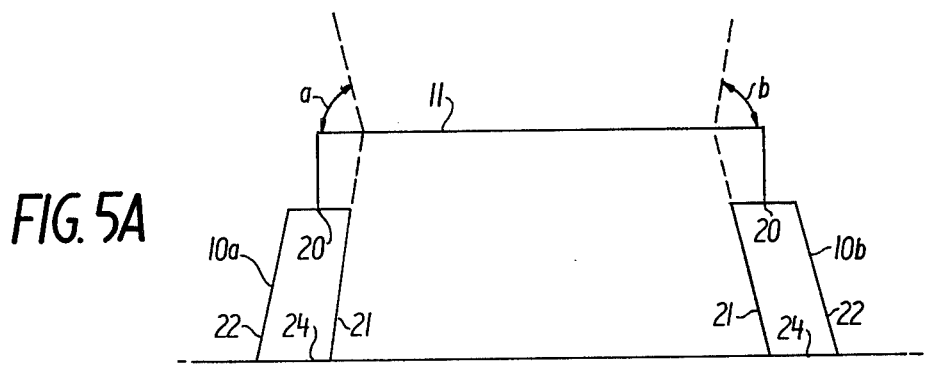
FIG. 5A and 5B are diagrams illustrating the effects of lateral forces on the wheel of the invention.

In the embodiment shown in FIGS. 1 – 3, a wheel designated generally 10 is secured to an axle member 11 by means of bolts 12 extending through holes in the central portion 14 of wheel 10. A ring member 15 integral with central portion 14 extends around same and includes a limiting flange 16 on the inboard side and an outwardly biased flange 17 on the outboard side of wheel 10.

Secured on the outer periphery of the ring member 15 between flanges 16 and 17 is a securing portion 20 which is secured thereto by bolts, rivets or other suitable fastening means. Extending upwardly from the securing portion 20 is an inboard spoke portion 21 which joins, opposite the securing portion 20, a ground engaging portion 24. An outboard spoke portion 22 extends inwardly from ground engaging portion 24 and connects with a further securing portion 20 which connects with a still further inboard spoke portion 21 and so on until an endless member designated generally 25 comprised of successive portions 21—21—24—22 surrounds ring member 15.

The endless member 25 is composed of a resilient material such as, for example, spring steel which is sufficiently strong to support the vehicle involved. As will be noted from the drawings, the ground engaging members are disposed diagonally so as to overlap as seen from the side and present a smooth, uninterrupted ground contact. The spoke portions 21 and 22 include curves at 26 and 27 which tend to bend when the weight of the vehicle is borne by the associated spoke, and thus cushion and distribute the weight onto the adjacent spoke portions.

If desired, adjacent ground engaging portions 24 may be connected by resilient connecting members 30, as shown in FIG. 4, which are secured thereto by any suitable fastening means (not shown).

The spokes 21 all lie in the surface of an imaginary cone having an apex angle of about 150°, more or less, whereas, to increase stability of the wheels, the spokes 22 all lie in the surface of an imaginary cone having a slightly less apex angle — say 145°, more or less.

Figure 5B:
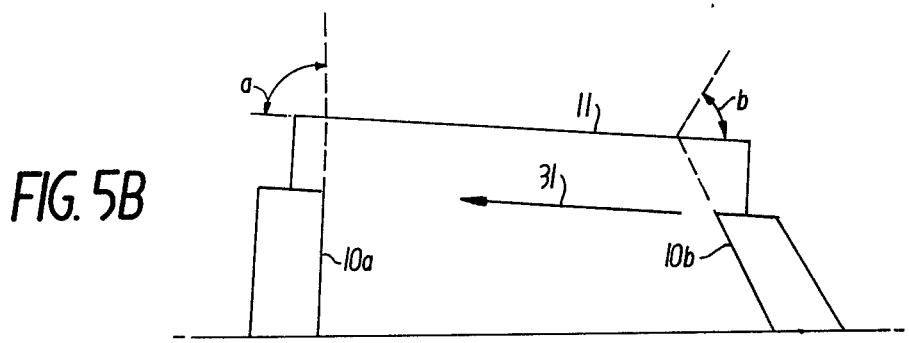

FIG. 5A illustrates a vehicle having wheels 10a and 10b without the application of lateral forces. The axle member 11 is horizontal and angles a and b (one-half the aforesaid apex angles) are equal. Application of lateral force (such as centrifugal force) in the direction of arrow 31, as shown in FIG. 5B, increases the angle a to almost 90° and angle b is similarly decreased to about 60°. The periphery of wheel 10a is thus effectively increased and the periphery of wheel 10b is effectively decreased whereby the axle 11 is caused to slant downwardly into the force applied. From this, it will be understood that the disclosed structure tends to lean into, rather than away from, a curve. Any tendency of wheels 10 to "walk" away from lateral forces is compensated in part by the relatively increased wheel periphery which occurs in the outboard wheels and is minimized by provision of connecting members 30.

Figure 6:
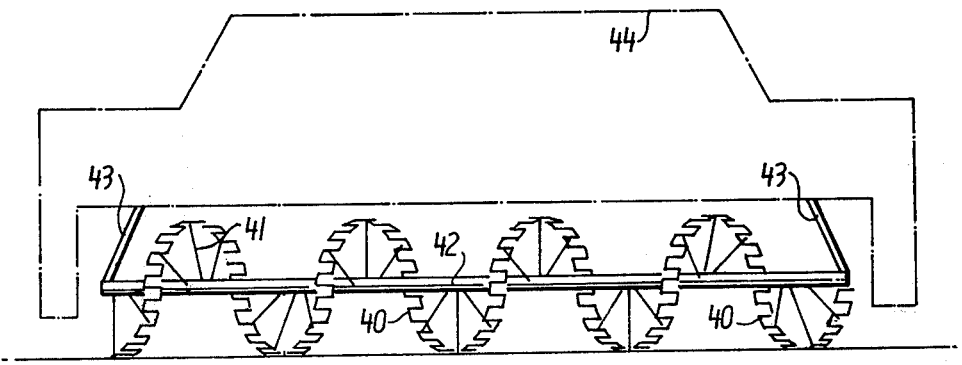
FIG. 6 is a representation in elevation of a further embodiment of the invention.

FIG. 6 shows an expansible wheel 40 which has a helical form and surrounds an axle 42. The spokes 41 are inclined increasingly outwardly from the center towards the sides as illustrated; the spokes 41 connecting the wheel 40 and the axle 42. The wheel 40 and spokes 41 are composed of a resilient material. Preferably, the wheel 40 is sinuous within the surface of an imaginary cylinder surrounding axle 42 so as to be capable of direct expansion or contraction. A vehicle 44, shown in dotdash lines, is carried on the axle 42 through supports 43.

Figure 7:
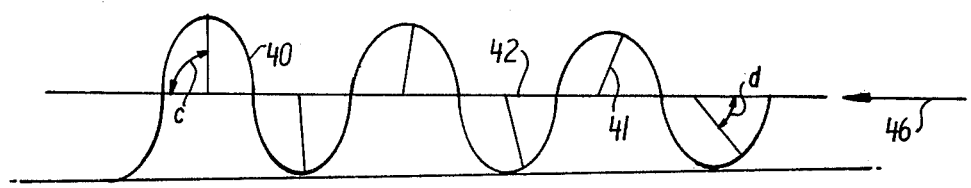
FIG. 7 is a diagram illustrating the application of lateral force on the embodiment shown in FIG. 6.

When force is applied in direction 46, as shown in the diagram of FIG. 7, the angles c, away from the application of force, tend to increase whereas the angles d toward the application of force decrease and axle 42 is thus caused to lean in a direction to meet the application of force as illustrated.

Referring to FIGS. 8 and 9, a wheel designated generally 50 comprises an axle means 51 which includes openings 52 spaced about the wheel's axis of rotation to receive bolts extending therefrom for interconnection to the axle of a vehicle, in a well-known manner. A plurality of bolts 54 extend from axle means 51 about its axis of rotation to secure a hub cap or cover means 53. A plurality of spoke guidance means 55 are secured about the periphery of axle means 51 by bolts 56 or other suitable means. As seen in FIG. 9, each guidance means 55 is trapezoidal in configuration and includes elongated aperatures 57 on the bottom and circular aperatures 58 at top. A pair of parallel spoke members 60 are each received through a top and bottom aperture 58 and 57. The upper end of each spoke member 60 is threaded to receive nuts 61 and a resilient washer 62 may be received on each spoke member 60 between nut 61 and the top of guidance means 55. Within each guidance means 55, each spoke member 60 has a stop 64 rigidly attached thereto, the stop 64 having a configuration whereby it may pass through aperature 57. Between each stop 64 and the under side of the top of guidance means 55 is compression spring 65 surrounding each spoke member 60 in this area and, being in compression, urging each spoke member 60 outwardly relative to the axis of rotation of axle means 51. The strength of each spring 65 is such that it is only partly compressed when conveying its share of the weight of the vehicle involved in both loaded and unloaded condition and is almost fully compressed when it is subjected to a substantially greater force such as when the segment of wheel 50 involved encounters a rock or bump in the road.

Each spoke member 60 terminates in its outermost end with a ball 66 of a ball and socket joint 67 in a steel shoe plate 70. Secured to plate 70 by bolts 71 in recesses 72 is a rubber surface contacting member 74. The upper portion of plate 70 has secured thereto a resilient bracket member 75 by bolts 71. Bracket member 75 includes a pair of U-shaped parts 76 each having an opening 77 to receive snugly the lower end of a spoke member 60. The bracket member 75 is provided with resilience such that under unloaded conditions with the normal downward force due to the weight of the vehicle carried by wheels 50 a lateral force applied parallel to the axis of rotation of the vehicle 80 which is slightly or somewhat less than that required to cause member 74 to slide laterally on a wet flat concrete or asphalt surface changes the angle of spoke members 60 to that indicated by dot-dash lines 81 and an opposite like force changes the angle of spoke members 60 to that indicated by dot-dash lines 82, with the spoke members 60 being guided and limited in their movement by elongated aperatures 57. Rubber bumpers 84 secured in guidance means 55 adjacent to and slightly overlapping aperatures 57 protect the ends of aperatures 57 from undue wear and increase the resilient resistance against spoke members 60 to lateral forces as indicated above.

The plates 70 and surface contacting members 74 may be of an overlapping parallelogram configuration as shown in FIG. 10 or overlapping on both sides as shown in FIG. 10a which causes following action in successive spoke members 60 and avoids any tendency of the wheel to "walk" sidewise when the vehicle is subject to lateral force.

In operation, the springs 65 provide vertical cushioning of the vehicle to some extent and permits surface contacting members 74 to adjust to the inclination of the underlying surface within limits. In the event of lateral force vectors acting on the vehicle, such as occur when the vehicle turns, is on an incline, has a collision involving impact on one side, or the like, there is a certain lateral movement of the vehicle which takes place prior to lateral sliding by the surface contacting members 74 whereby the lateral force may, in effect, be absorbed and the sliding averted. Also, for reasons heretofore explained there is a tendency for a vehicle provided with wheels 50 50 to "lean" into a curve.

Figure 13:
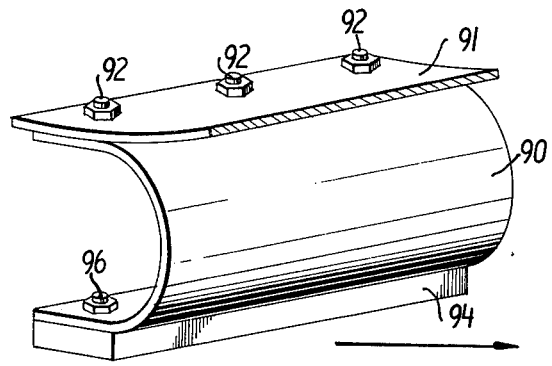
Figure 14:
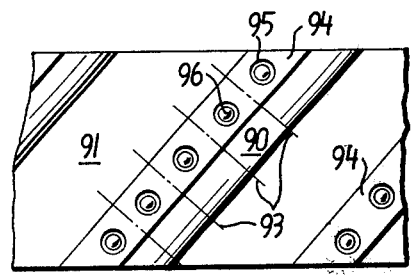
FIG. 14 depicts the relationship between adjacent lugs as shown in FIG. 13 when attached to the wheel of a tractor.
Figure 15:
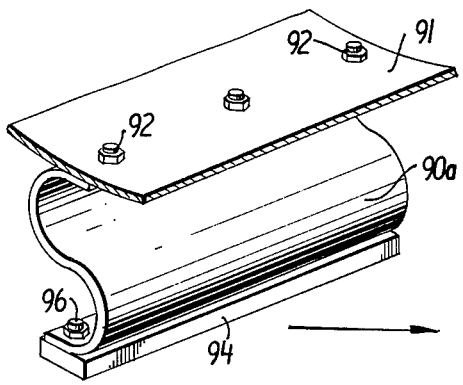
FIG. 15 shows a further embodiment of a lug similar to FIG. 13.

Referring to FIGS. 13 and 14, a lug 90 is bolted or otherwise secured to a steel tractor wheel 91 by a plurality of bolts 92, the lug 90 is curved so as to have a U-shaped configuration and has a rubber strip 94 bolted or otherwise secured to its opposite outward arm for contacting the ground. Strip 94 includes recesses 95 to receive the bolts 96. It will be noted from FIG. 14 that the lugs 90 are bolted to the wheel 91 so as to be biased relative to its normal directions of travel and with the strips 94 overlapping so there always will be at least one strip 94 contacting the ground. If desired, lug 90 and strip 94 can be divided as indicated by dot-dash lines 93 whereby it constitutes a plurality of lugs which act independently. FIG. 15 shows a lug 90a which is S-shaped, but otherwise similar to lug 90. The lugs 90 and 90a may be used with or in lieu of the lugs otherwise provided on a lugged steel tractor wheel or the like. If used with such lugs, then lugs 90 and 90a should extend beyond the existing lugs on the wheel. Preferably, lugs 90 and 90a are made of resilient steel. With such lugs, it is possible to travel on surfaced roads and highways which would be otherwise damaged. At the same time, the lugs 90 and 90a provide superior traction to pneumatic tractor tires under most conditions.

Although I have described preferred embodiments of my invention, it is to be understood that it is capable of other adaptions and modifications within the scope of the appended claims.

Having thus described my invention, what I claim as new and desire to secure by Letters Patent of the U.S. is:

1. A wheel which comprises axle means, an expansible periphery means, resilient means including spoke means interconnecting said axle means and said expansible periphery means and lying in a conical surface having its apex in said axle means, whereby said spoke means are resiliently movable relative to said axle means in directions substantially parallel to the wheel's axis of rotation, said periphery means and said resilient means being rigidly secured by securing means to said axle means, said periphery means, said resilient means and said securing means comprising an endless member composed of resilient material.

2. A wheel which comprises axle means, an expansible periphery means, resilient means including spoke means interconnecting said axle means and said expansible periphery means and lying in a conical surface having its apex in said axle means, whereby said spoke means are resiliently movable relative to said axle means in directions substantially parallel to the wheel's axis of rotation, said periphery means including overlapping parallel ground engagement portions not rigidly connected to each other and extending diagonally with reference to a plane perpendicular to the axis of rotation of said axle means whereby said ground engagement portions define a continuous circle as seen from the side.

3. A wheel in accordance with claim 2 wherein connecting means is provided to connect said ground engaging portions.

4. A wheel which comprises axle means, an expansible periphery means, resilient means including spoke means interconnecting said axle means and said expansible periphery means and lying in a conical surface having its apex in said axle means, whereby said spoke means are resiliently movable relative to said axle means in directions substantially parallel to the wheel's axis of rotation, said expansible periphery means defining a continuous circle as seen from the side and being of a helical form lying in a cylindrical surface with said axle means coinciding with the longitudinal axis of said cylindrical surface.

5. A wheel in accordance with claim 4 wherein said periphery means has a sinuous configuration relative to said helical form.

6. A wheel which comprises axle means, an expansible periphery means, resilient means including spoke means interconnecting said axle means and said expansible periphery means and lying in a conical surface having its apex in said axle means, whereby said spoke means are resiliently movable relative to said axle means in directions substantially parallel to the wheel's axis of rotation, guidance means rigidly interconnected to said axle means being provided to define the resilient movement of said spoke means, said guidance means including an elongated slot which receives said spoke means.

7. A wheel which comprises axle means, an expansible periphery means, resilient means including spoke means interconnecting said axle means and said expansible periphery means and lying in a conical surface having its apex in said axle means, whereby said spoke means are resiliently movable relative to said axle means in directions substantially parallel to the wheel's axis of rotation, further resilient means comprising a compression spring interconnecting said spoke means with said axle means associated with said spoke means for resiliently supporting said axle means.

8. A wheel which comprises axle means, an expansible periphery means, resilient means including spoke means interconnecting said axle means and said expansible periphery means and lying in a conical surface having its apex in said axle means, whereby said spoke means are resiliently movable relative to said axle means in directions substantially parallel to the wheel's axis of rotation, said periphery means being substantially coplanar with the surface of a cylinder for substantially its entire width and defining an unbroken circle as seen from the side.

9. A wheel in accordance with claim 8, wherein said periphery means comprises overlapping surface contacting members which are not rigidly connected to each other.

* * * * *